March 20, 1951
C. W. HOUGH
2,545,465
STEREOSCOPIC APPARATUS
Filed Dec. 18, 1946
4 Sheets-Sheet 1
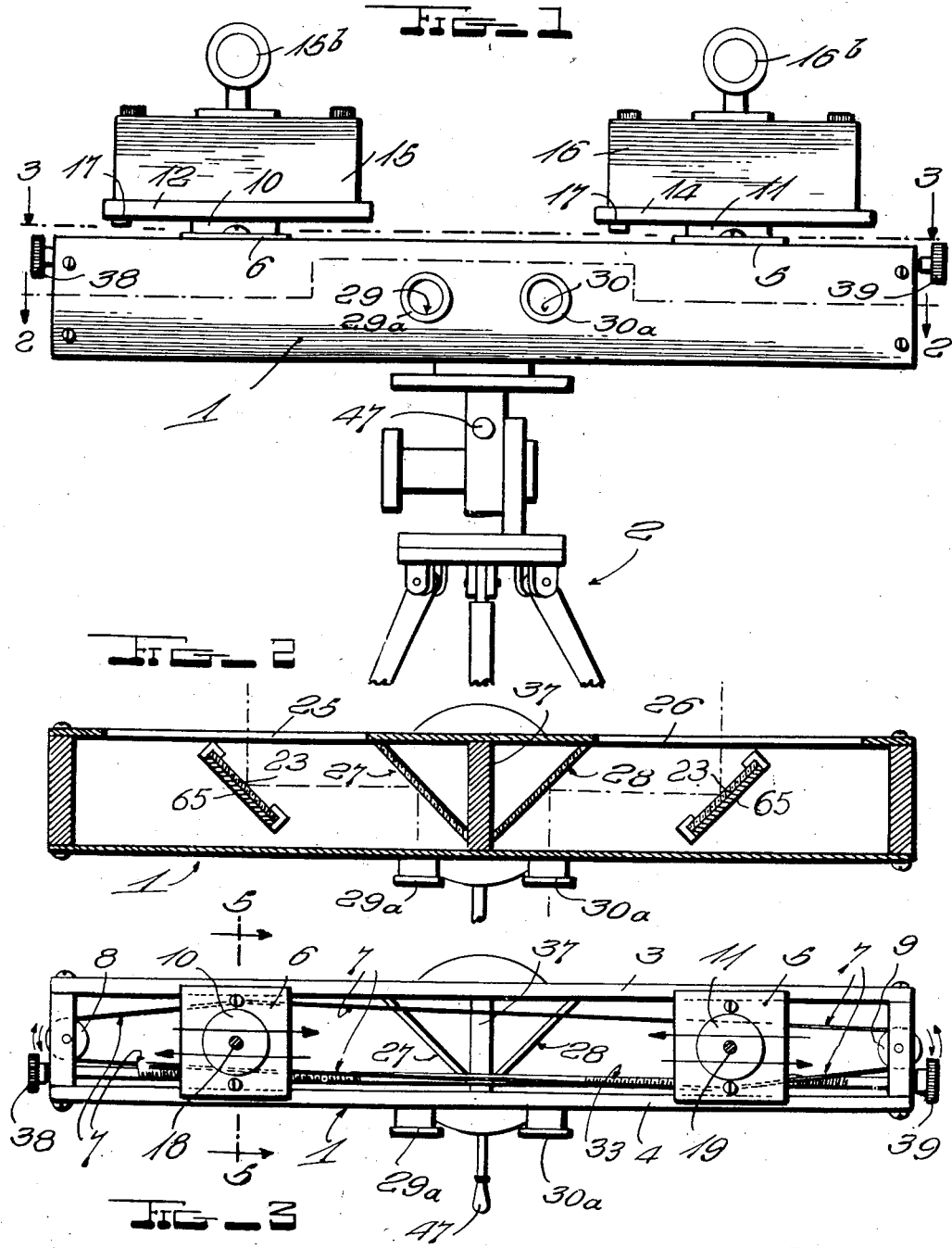
INVENTOR.
Clinton W. Hough,
BY
John B. Brady
ATTORNEY March 20, 1951     C. W. HOUGH     2,545,465
STEREOSCOPIC APPARATUS
Filed Dec. 18, 1946     4 Sheets-Sheet 2
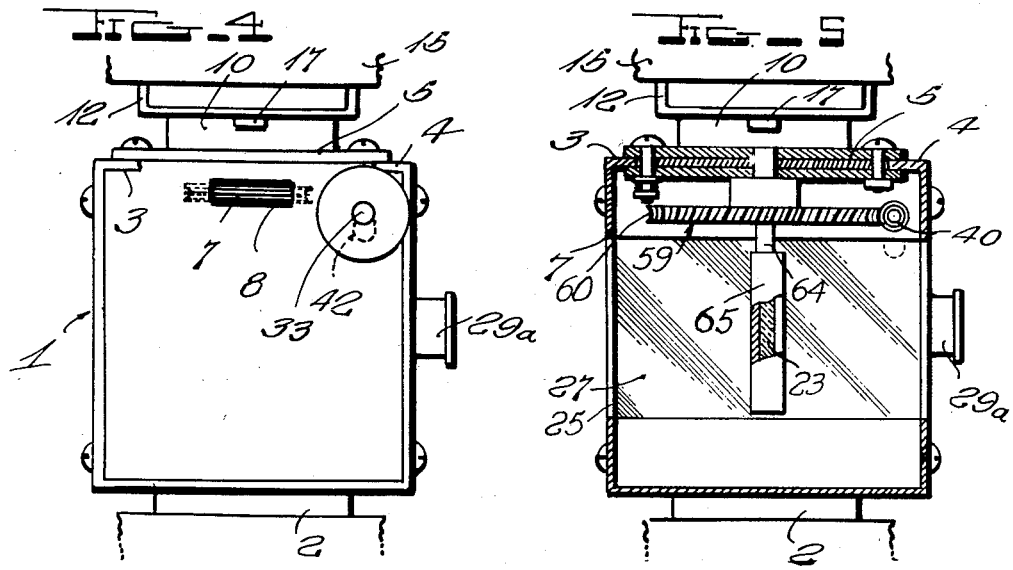
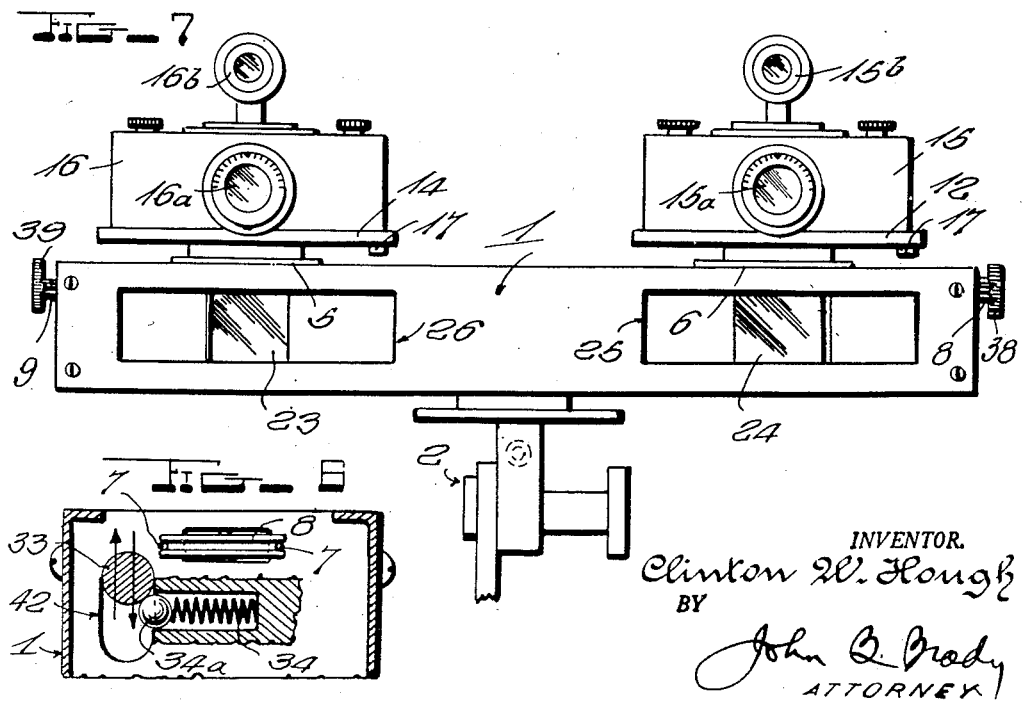
INVENTOR.
Clinton W. Hough
BY
John B. Brody
ATTORNEY March 20, 1951  C. W. HOUGH  2,545,465
STEREOSCOPIC APPARATUS
Filed Dec. 18, 1946  4 Sheets-Sheet 3
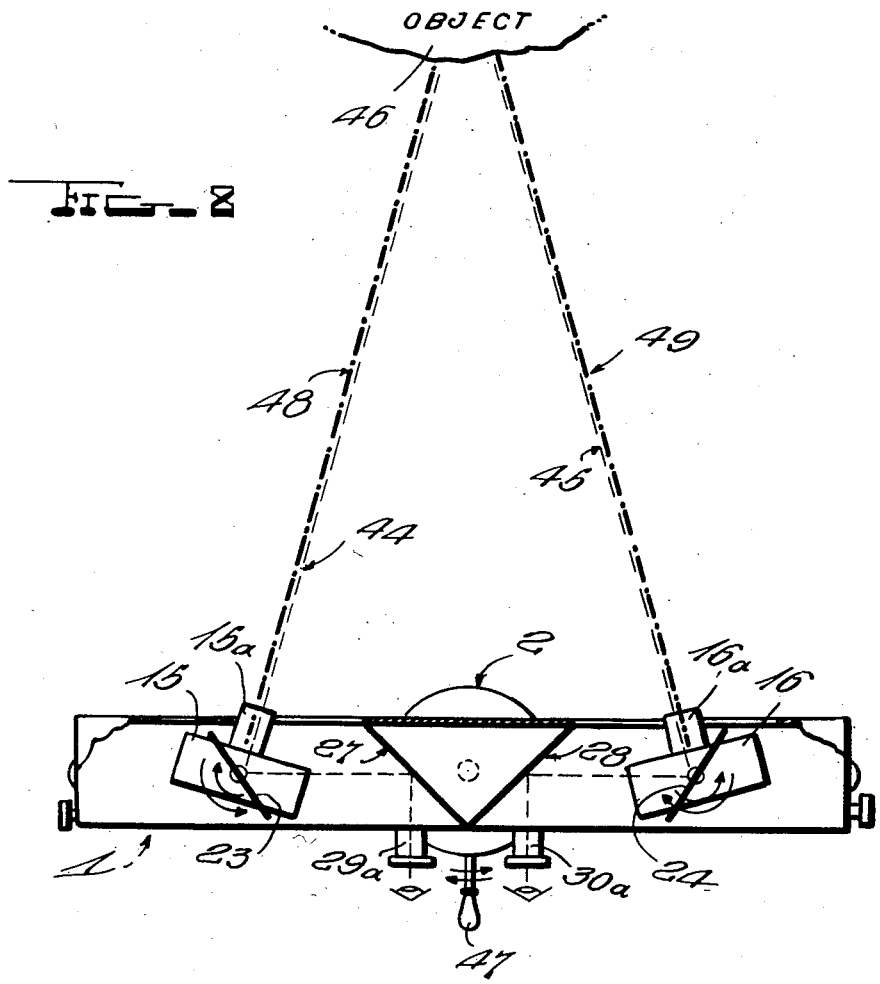
INVENTOR.
Clinton W. Hough,
BY
John B. Brady
ATTORNEY March 20, 1951 C. W. HOUGH 2,545,465
STEREOSCOPIC APPARATUS
Filed Dec. 18, 1946 4 Sheets-Sheet 4
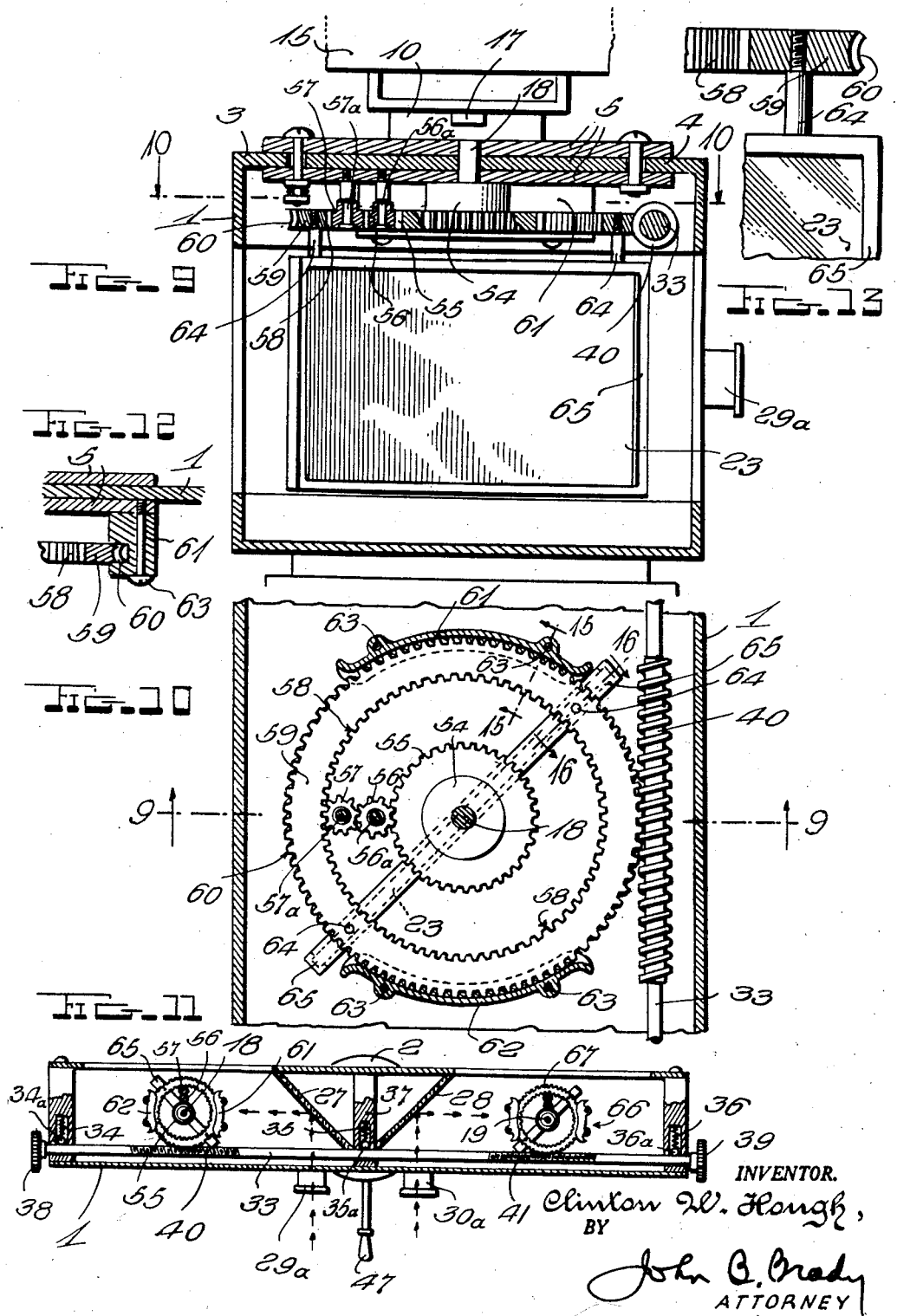
INVENTOR.
Clinton W. Hough,
BY
John C. Brady
ATTORNEY Patented Mar. 20, 1951

2,545,465

UNITED STATES PATENT OFFICE 2,545,465

STEREOSCOPIC APPARATUS

Clinton W. Hough, Pasadena, Calif.

Application December 18, 1946, Serial No. 716,899

7 Claims. (Cl. 95—18)

My invention relates broadly to photography and more particularly to a system for preparing stereoscopic photographs.

One of the objects of my invention is to provide a simplified mechanism which may be employed in the taking of photographs for securing stereoscopic photographic effects.

Another object of my invention is to provide a mounting for a pair of cameras which may be focused upon the same objective and adjusted at angles thereto which are predetermined to produce views which when brought together for simultaneous observation through an optical viewer give striking stereoscopic effects.

A further object of my invention is to provide a multiple camera support and focusing means including means for adjusting the spatial distance between the cameras and the angular relation thereof with respect to the objective for the taking of stereoscopic photographs.

Still another object of my invention is to provide a construction of camera mounting means for the taking of stereoscopic pictures in which a pair of cameras are each provided with mirrors adjustable simultaneously with the angular setting of the cameras with respect to an objective and observable through an optical focusing device.

Other and further objects of my invention reside in a mechanism for mounting and adjusting a pair of cameras for the taking of stereoscopic pictures as set forth more fully in the specification hereinafter following by reference to the accompanying drawings in which:

Figure 1 is a rear view of the stereoscopic photographing apparatus of my invention; Fig. 2 is a horizontal sectional view taken substantially on line 2—2 of Fig. 1; Fig. 3 is a horizontal sectional view taken substantially on line 3—3 of Fig. 1; Fig. 4 is an end view of the stereoscopic apparatus of my invention shown on a somewhat enlarged scale; Fig. 5 is a transverse sectional view taken substantially on line 5—5 of Fig. 3; Fig. 6 is a fragmentary view illustrating the manner of coupling and uncoupling the adjustment means with the right and left hand gears associated with the turn tables of each of the cameras for adjusting the angular position of the cameras with respect to an objective; Fig. 7 is a front view of the stereoscopic apparatus of my invention; Fig. 8 is a theoretical view showing the manner of adjusting the stereoscopic apparatus with respect to an objective for the securing of the required stereoscopic images; Fig. 9 is a detailed vertical sectional view of the gear mechanism with certain of the parts illustrated in elevation by which the mirror reflectors associated with the cameras turn only half as fast as the cameras turn when adjusting the apparatus, the view being taken substantially on line 9—9 of Fig. 10; Fig. 10 is a horizontal view taken substantially on line 10—10 of Fig. 9; Fig. 11 is an assembly view of the apparatus in horizontal section and showing the gear mechanism of Fig. 9 in position enabling the angle of view as seen through the reflectors to change at twice the rate of change of the angle through which the reflectors turn; Fig. 12 is a fragmentary vertical sectional view taken on line 12—12 of Fig. 10; and Fig. 13 is a fragmentary vertical sectional view taken on line 13—13 of Fig. 10.

Referring to the drawings in detail reference character 1 designates a relatively long substantially rectangular box-like enclosure which may be held in the hand or mounted on a tripod represented at 2. The box-like enclosure is open at the top and is provided with a pair of substantially parallel extending rails 3 and 4 on which a pair of slides 5 and 6 are adjustably mounted. These slides 5 and 6 may be brought together at the center of the top of the box 1 on rails 3 and 4 or may be slid out of the ends of the box. Their movement is controlled mechanically so that the slides 5 and 6 move simultaneously and are always the same distance from the center of the box 1, that is, if one slide is moved toward the end of the box 1, the other slide is pulled toward its end of the box 1 through the same distance. This is accomplished by means of a wire or flexible cable 7 running over pulleys 8 and 9 journalled in the ends of box 1 and interconnected with the slides 5 and 6 for securing the reverse movement of the slides upon manual adjustment clockwise or counter-clockwise of the projecting portions of the pulleys 8 and 9 through the opposite ends of the box 1.

Each of the slides 5 and 6 forms a mounting means for a turn table which I have represented at 10 and 11. Each turn table 10 and 11 carries a supporting plate 12 and 14 forming a mounting means for cameras 15 and 16. The cameras 15 and 16 are provided with objective lens systems 15a and 16a and view finder systems 15b and 16b. Each different make of camera requires slightly different mounting so that each of the plates 12 and 14 are provided with such adaptor means as will accommodate different constructions of cameras. In the arrangement shown an adjustable tripod screw 17 is carried by each of the mounting plates for properly adjusting the position of each camera.

Underneath the turn tables 10 and 11 there are vertically extending shaft members 18 and 19. Shafts 18 and 19 depend from the slides 5 and 6 and support spur gears 55 shown more clearly in Figs. 5, 9, 10 and 11.

The mirrors 23 and 24 are normally supported in vertical planes facing forward at 45° with respect to the cameras 15 and 16 and also at 45° with respect to oblong openings 25 and 26 in the front of box 1. These mirrors 23 and 24 are also disposed at 90° from each other so that they reflect the view of an objective in the field in front of the two oblong openings 25 and 26 toward the center of the box where the two reflections impinge upon two additional mirrors 27 and 28 placed in the shape of a V at 90° at the center of the box 1.

These last two mirrors 27 and 28 reflect the view toward the back of the box 1 where the mirrors may be observed through two apertures 29 and 30 substantially in the center of the box 1 and spaced eye distance apart. When the camera supporting slides 5 and 6 are brought together, the view of the scene to be photographed is the normal stereoscopic view obtained with normal eye separation. As the slides 5 and 6 are moved further apart toward the opposite ends of the box 1, an exaggerated perspective is obtained until finally the eyes of the observer at the eye pieces 29a and 30a refuse to blend the two views because they are too different. This refusal to blend varies with the optical ability of different individuals. Some individuals cannot merge two different pictures taken at normal eye separation, others can merge and see at one picture two views taken three or four times as far apart. These super stereos are produced by extended interocular vision.

I have found the wide separation of cameras 15 and 16 highly successful in producing stereo pictures of distant objects, mountain views, etc. and other objectives, but such wide separation has proven unsatisfactory because near objects could not be merged by the eyes of a large percentage of viewers. Realizing this defect I developed the construction herein set forth in which the gear mechanism is associated with each of the depending shafts 18 and 19 as hereinbefore explained so that the angle of the reflecting mirrors 23 and 24 changes at half the speed of angular change of the cameras 15 and 16. The ring gears 59 may be driven by the adjustable shaft 33 which is mounted longitudinally of the enclosing box 1 and is supported therein to provide coupling and uncoupling relation with the ring gears 59 against the action of spring members 34, 35 and 36. Spring members 34 and 36 are mounted in the ends of box 1 while spring member 35 is mounted in partition 37 within box 1. The coil springs 34, 35 and 36 bear against ball members 34a, 35a and 36a which operate to disengage shaft 33 with respect to ring gears 59. However, the pressure exerted by springs 34, 35 and 36 may be readily overcome by manual pressure against the knurled knobs 38 and 39 at the opposite ends of the shaft 33 for meshing the worm teeth 40 and 41 with the teeth 60 of gears 59 respectively when angular adjustment of the position of cameras 15 and 16 becomes necessary. The worm teeth 40 on shaft 33 have a right hand pitch whereas worm teeth 41 have a left hand pitch correlated with the teeth 60 on ring gears 59.

The gear mechanism is divided in accordance with well known principles into two parts so that the angle of view as seen through the reflectors changes at twice the rate of change of the angle through which the reflector turns. That is, the mirrors are so connected with the cameras that they turn only half as fast as the cameras or, so that when the cameras face straight ahead, the mirrors will be at a 45° angle to the lens axis. This may be accomplished as illustrated in Figs. 9–13, wherein the slide 5 on which turntable 10 is mounted is longitudinally adjustable with respect to box 1. Shaft 18 carries mounting member 54 which supports spur gear 55 which turns with the camera 15. Spur gear 55 meshes with a pair of idler gears 56 and 57 which are rotatable about depending studs 56a and 57a which are mounted in slide 5. The idler gears mutually mesh with each other with idler gear 56 in mesh with spur gear 55. The idler gear 57 meshes with the teeth internally arranged as shown at 58 on ring gear 59. Ring gear 59 has the exterior periphery thereof provided with worm gear teeth 60 which mesh with the worm teeth 40 on shaft 33 as explained in connection with the structure shown in Fig. 7.

The ring gear 59 is mounted to freely revolve in a horizontal plane in spaced relation to the slide 5 in a position for insuring meshing of the worm gear teeth 60 with the worm teeth 40 by a pair of grooved suspension members represented at 61 and 62. Each suspension member is formed in the shape of a sector fastened by means of screw-threaded members 63 which pass therethrough to the under surface of slide 5. Thus the ring gear 59 revolves within limits under control of adjustable shaft 33. The ring gear 59 serves as a suspension means through posts 64 for the frame 65 of mirror 23. The camera-mirror combination associated with shaft 19, indicated in Figs. 2, 3 and 14 is identical to that explained in connection with shaft 18, and the assembly has been indicated generally at 66 as shown in Fig. 11, identical with the assembly explained in connection with Figs. 9–10. The ring gear 67 is shown having the worm gear teeth on the periphery thereof meshing with the worm teeth 41 on shaft 43.

As the shaft 33 is pushed up in the slots 42 and 43 in opposite ends of the box 1, the worms 40 and 41 mesh with the gear teeth 60 of ring gears 59 whereas when shaft 33 is pushed down past the ball detents 34a, 35a and 36a the worms 41 and 42 are thrown out of mesh with ring gears 59. Under these conditions the turn tables 5 and 6 may be readily moved closer together or further apart as the picture requires. The wire traverse 7 operating over pulleys 9 insures that the turn tables are always the same but varying distances from the center of the box 1.

By virtue of the adjustment afforded by shaft 33 under control of knobs 38 and 39 the cameras 15 and 16 may be so adjusted in position that there is a toeing in of the cameras toward a stereoscopic vanishing point. By changing the toeing in relation the stereoscopic effect in the ultimate pictures can be controlled. The pictures obtainable are startlingly realistic. The device permits the actual seeing of the stereo picture by sighting through eye pieces 29a and 30a while making the required adjustments of the cameras 15 and 16 and before taking the pictures.

The adjustment afforded by shaft 33 and the oppositely pitched teeth 60 on ring gears 59 and the oppositely directed worms 40 and 41 are such that the cameras 15 and 16 may be moved so that the photographic axes of the cameras looking in the direction of the objective lenses 15a and 16a of the cameras may be parallel or they may toe-in or toe-out. Having once established the adjustment for a certain objective the cameras are maintained in the desired angular positions and the slides 5 and 6 are locked in position by appropriate clamping means on the wire traverse 7 or by clamping the slides 5 and 6 in relation to the rails 3 and 4. When the slides 5 and 6 have been fixed in position the shaft 33 may be moved to the position meshing worm 40 with the teeth 60 of ring gear 59 and worm 41 with the teeth of the other ring gear 59 for performing through movement of knobs 38 and 39 such micrometer adjustments as the operator may find necessary when viewing the objective through eye pieces 29a and 30a. By calibrating the knobs 38 and 39 with respect to scales on the end of box 1 the angular setting of the cameras may be more readily restored for use on certain objectives thus enabling the operator to set the camera lens distance scales at the proper footage.

The apparatus is very simple in construction. The box 1 measures but approximately 18" long and approximately 2½" x 2½" square and may be readily formed from sheet metal such as aluminum or stainless steel.

The stereo pictures which are taken by the photographic apparatus of my invention are in the form of color transparencies or prints and are mounted in slides which fit into viewing binoculars. The effect is highly realistic.

In Fig. 8 I have represented the manner in which the apparatus is set up with respect to an objective and observation made through eye pieces 29a and 30a along optical paths represented by dotted lines 44 and 45 with respect to the objective 46. The box 1 is angularly shifted by manipulating handle 47 operative with respect to the tripod 2. Inasmuch as mirrors 23 and 24 are movable in direct relation to the adjustment of the axes of the objectives 15a and 16a of cameras 15 and 16, the precise spacial relation of the cameras is determined and the precise angular setting of the cameras effected until the two separate views merge in the operator's eyes, whereupon cameras 15 and 16 may be simultaneously actuated by a dual shutter control mechanism or successively actuated in the case of stationary objectives. The photographs are taken along the optical paths represented at 48 and 49.

While I have described my invention as employing mirrors 23 and 24, and 27 and 28, I desire that it be understood that I may substitute prisms for the mirrors. Prisms under certain conditions operate somewhat better than the mirrors because of their higher efficiency and because the glass mirrors which are silvered on the back, give two reflections, one from the back silvered surface and a fainter reflection from the surface of the glass. I may use surface silvered mirrors or metal mirrors to eliminate the double reflection but I have found in practice that the rear surfaced glass mirrors have practical advantages. They are much lighter than prisms and much less expensive and the double reflection cannot be seen at all in the eye-pieces. Furthermore, rear surfaced mirrors may be cleaned easily without damage to the reflecting surface as so often happens to silver surfaced mirrors where the silver surface is not protected by the glass. When prisms are used they may be mounted to shift angularly with the turntables in the same manner in which the mirrors are shifted.

While I have described my invention in certain embodiments I realize that modifications may be made and I desire that it be understood that no limitations upon my invention are intended other than may be imposed by the scope of the appended claims.

What I claim as new and desire to secure by Letters Patent of the United States is as follows:

1. A stereoscopic photographing apparatus comprising an elongated centrally partitioned housing, mirrors located approximately 45° to the center of the partitioned housing, eye-pieces carried by one side of said housing and aligned with said mirrors, a pair of camera supports pivotally and slidably adjustable on said housing and each operatively connected with a mirror extending into said housing and optically aligned with the aforesaid mirrors, viewing apparatus in the opposite side of said housing aligned with said last mentioned mirrors and means for adjusting the spacial distance between said camera supports and the angular position thereof while optically observing an objective through said eye-pieces.

2. A stereoscopic photographing apparatus comprising an elongated centrally partitioned housing, reflecting means located approximately 45° to the center of the partitioned housing, eye-pieces carried by one side of said housing and aligned with said reflecting means, a pair of supporting devices for cameras pivotally and slidably adjustable on said housing and each operatively connected with reflecting means extending into said housing and optically aligned with the aforesaid reflecting means, viewing apparatus in the opposite side of said housing aligned with said last mentioned reflecting means and means for selectively orienting said housing while adjusting the spacial distance between said supporting devices for cameras and the angular position thereof with respect to an objective as viewed through said eye-pieces.

3. A stereoscopic photographing apparatus comprising an elongated centrally partitioned housing, mirrors located approximately 45° to the center of the partitioned housing, eye-pieces carried by one side of said housing and aligned with said mirrors, a pair of camera supports pivotally and slidably adjustable on said housing and each operatively connected with a mirror extending into said housing and optically aligned with the aforesaid mirrors, viewing apparatus in the opposite side of said housing aligned with said last mentioned mirrors and means for simultaneously advancing said cameras and the mirrors associated therewith toward each other or away from each other while optically observing an objective through said eye-pieces.

4. In an apparatus of the class described, a supporting housing including a longitudinally extending rail portion, slides adjustably supported on said rail portion, turntables mounted on each of said slides for receiving a photographic camera thereon, a mirror operatively connected with each of said turntables and projecting into said housing, optical viewing means carried by said housing and associated with said mirrors, a pulley member located in each end of said housing and a pair of cables extending through said supporting housing and passing around said pulley members in each end thereof and fastened at positions along the length thereof to the respective slides whereby spacial relation of said turntables and the mirrors associated therewith may be adjusted by equal increments while observing an objective through said optical viewing means.

5. A stereoscopic photographing apparatus comprising an elongated centrally partitioned housing, mirrors located approximately 45° to the center of the partitioned housing, eye-pieces carried by one side of said housing and aligned with said mirrors, a pair of slides adjustably mounted on said housing, a turntable journaled on each of said slides and each adapted to support a camera thereon, a mirror associated with each of said turntables and extending into said housing and optically aligned with the aforesaid mirrors, viewing apparatus in the opposite side of said housing aligned with said last mentioned mirrors, a pulley member journaled in each end of said housing, and a cable looped around said pulley members and extending through said housing and fastened at spaced intervals to the respective slides whereby the turntables and the mirrors associated therewith may be adjusted toward or away from each other by equal increments while optically observing an objective through said eye-pieces.

6. A stereoscopic photographing apparatus comprising an elongated centrally partitioned housing, mirrors located approximately 45° to the center of the partitioned housing, eye-pieces carried by one side of said housing and aligned with said mirrors, a pair of slides adjustably mounted on said housing, mirrors carried by said slides and extending into said housing in the optical axes of the aforesaid mirrors, angularly adjustable means associated with each of said slides and the mirrors carried thereby, each of said means being adapted to support a camera, said angularly adjustable means each operatively controlling the angular position of said last mentioned mirrors, viewing apparatus in the opposite side of said housing aligned with said first mentioned mirrors, right and left hand pitched gears associated with said angularly adjustable means, a shaft journaled longitudinally of said housing and having right and left hand pitched threads thereon adapted to mesh with said right and left hand pitched gears and means for revolving said shaft from either end thereof for toeing in or toeing out the angularly adjustable means and the mirrors associated therewith at a rate which is half the rate of movement of said cameras while optically observing an objective through said eye-pieces.

7. A stereoscopic photographing apparatus comprising an elongated centrally partitioned housing, mirrors located approximately 45° to the center of the partitioned housing, eye-pieces carried by one side of said housing and aligned with said mirrors, a pair of slides adjustably mounted on said housing, a turntable mounted on each of said slides for receiving and supporting a depending mirror and an upwardly extending camera thereon, and each of said turntables operatively controlling the angular position of said depending mirrors, said last mentioned mirrors extending into said housing and optically aligned with the first mentioned mirrors, viewing apparatus in the opposite side of said housing aligned with said first mentioned mirrors, right and left hand pitched gears associated with said turntables, a shaft journaled longitudinally of said housing and having right and left hand pitched threads thereon adapted to mesh with said right and left hand pitched gears, means for revolving said shaft from either end thereof for toeing in or toeing out the turntables and the mirrors associated therewith at a rate which is half the rate of movement of said cameras while optically observing an objective through said eye-pieces, means for meshing and unmeshing the threads on said shaft with said right and left hand pitched gears and means for adjusting the spacial distance between the depending mirrors supported by said turntables and said first mentioned mirrors when said shaft and gears are unmeshed.

CLINTON W. HOUGH.

REFERENCES CITED

The following references are of record in the file of this patent:

UNITED STATES PATENTS

| Number | Name | Date |
|---|---|---|
| 2,303,742 | Howells | Dec. 1, 1942 |
| 2,413,996 | Ramsdell | Jan. 7, 1947 |

FOREIGN PATENTS

| Number | Country | Date |
|---|---|---|
| 600,224 | Germany | July 19, 1934 |